United States Patent
Zhu

(10) Patent No.: US 12,136,896 B2
(45) Date of Patent: Nov. 5, 2024

(54) METHOD AND APPARATUS FOR ADJUSTING VIBRATION WAVEFORM OF LINEAR MOTOR

(71) Applicant: HONOR DEVICE CO., LTD., Shenzhen (CN)

(72) Inventor: Jianwei Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/910,989

(22) PCT Filed: Mar. 23, 2022

(86) PCT No.: PCT/CN2022/082415
§ 371 (c)(1),
(2) Date: Sep. 12, 2022

(87) PCT Pub. No.: WO2022/242300
PCT Pub. Date: Nov. 24, 2022

(65) Prior Publication Data
US 2024/0178771 A1   May 30, 2024

(30) Foreign Application Priority Data

May 20, 2021 (CN) .......................... 202110553954.5
Jun. 16, 2021 (CN) .......................... 202110666462.7

(51) Int. Cl.
*H02P 6/00* (2016.01)
*H02P 23/00* (2016.01)
*H02P 25/06* (2016.01)

(52) U.S. Cl.
CPC .......... *H02P 6/006* (2013.01); *H02P 23/0077* (2013.01); *H02P 25/06* (2013.01)

(58) Field of Classification Search
CPC ....................................................... H02P 25/06
See application file for complete search history.

(56) References Cited

U.S. PATENT DOCUMENTS 8,896,524 B2   11/2014   Birnbaum et al.
9,245,429 B2 *   1/2016   Cruz-Hernandez ...... G08B 6/00
(Continued)

FOREIGN PATENT DOCUMENTS

CN   105322842 A   2/2016
CN   106059440 A   10/2016
(Continued)

OTHER PUBLICATIONS

Jonghyun Ryu+pos VibEditor;"Graphical authoring tool of vibrotactile patterns";2008 IEEE International Workshop on Haptic Audio visual Environments and Games;Oct. 18, 2008;6 pages.

*Primary Examiner* — Said Bouziane
(74) *Attorney, Agent, or Firm* — WOMBLE BOND DICKINSON (US) LLP

(57) ABSTRACT

A method and an apparatus for adjusting a vibration waveform of a linear motor. At least one of the following steps is performed: obtaining a frequency of a steady-state waveform of a vibration description file, and mapping the frequency to a target frequency according to a preset first mapping rule and a frequency of the linear motor; or obtaining a transient waveform of the vibration description file and expanding the transient waveform into a waveform sequence formed by a plurality of target transient waveforms, where the frequency of the waveform sequence is the same as a frequency of the transient waveform of the vibration description file, and a frequency of a target transient waveform is adapted to the linear motor. Therefore, both the steady-state waveform and the transient waveform can be adapted to the characteristics of the linear motor, thereby improving the vibration effect of the linear motor.

20 Claims, 8 Drawing Sheets

(56) References Cited

U.S. PATENT DOCUMENTS

| | | | |
|---|---|---|---|
| 10,026,276 | B2 | 7/2018 | Rank et al. |
| 10,394,326 | B2 | 8/2019 | Ono et al. |
| 10,965,803 | B2 | 3/2021 | Li et al. |
| 2005/0237011 | A1 | 10/2005 | Woods et al. |
| 2013/0021276 | A1 | 1/2013 | Bang |
| 2019/0391653 | A1 | 12/2019 | Ono et al. |
| 2020/0056933 | A1* | 2/2020 | Deng .................. G01H 1/16 |
| 2021/0110841 | A1 | 4/2021 | Maximilian et al. |

FOREIGN PATENT DOCUMENTS

| | | | |
|---|---|---|---|
| CN | 106133650 | A | 11/2016 |
| CN | 106160622 | A | 11/2016 |
| CN | 109887528 | A | 6/2019 |
| CN | 110312038 | A | 10/2019 |
| CN | 111030412 | A | 4/2020 |
| CN | 111552377 | A | 8/2020 |
| CN | 111966211 | A | 11/2020 |
| CN | 112114674 | A | 12/2020 |
| CN | 112121411 | A | 12/2020 |
| CN | 112269895 | A | 1/2021 |
| CN | 112506341 | A | 3/2021 |
| EP | 2701037 | A2 | 2/2014 |
| EP | 2743800 | A2 | 6/2014 |
| EP | 2846221 | A1 | 3/2015 |
| EP | 4119207 | A1 | 1/2023 |
| WO | 2018223535 | A1 | 12/2018 |

* cited by examiner

METHOD AND APPARATUS FOR ADJUSTING VIBRATION WAVEFORM OF LINEAR MOTOR

CROSS-REFERENCE TO RELATED APPLICATIONS

This application is a National Stage of International Application No. PCT/CN2022/082415, filed Mar. 23, 2022, which claims priority to Chinese Patent Application No. 202110553954.5, filed May 20, 2021, and Chinese Patent Application No. 202110666462.7, filed Jun. 16, 2021. The disclosures of the aforementioned applications are hereby incorporated by reference in their entireties.

TECHNICAL FIELD

This application relates to the field of electronic information, and in particular, to a method and an apparatus for adjusting a vibration waveform of a linear motor.

BACKGROUND

At present, linear motors may be basically divided into X-axis linear motors and Z-axis linear motors according to different travel directions. Different types of linear motors need to be controlled based on different control parameters. Control parameters are generally written in vibration description files.

A vibration description file generally matches with a vibration effect required by a user, that is, the user configures the vibration description file according to the required vibration effect. In practice, the occurrence of vibration is not only based on the vibration description file, but also based on a linear motor. That is, the vibration effect is related to attributes of the linear motor. Therefore, it is possible that the linear motor cannot provide the required vibration effect.

SUMMARY

This application provides a method and an apparatus for adjusting a vibration waveform of a linear motor, to improve the vibration effect of a linear motor.

To achieve the foregoing objective, this application provides the following technical solutions:

According to a first aspect of this application, a method for adjusting a vibration waveform of a linear motor is provided, applicable to an electronic device, where the electronic device includes a linear motor, and the method includes the following steps: obtaining a frequency of a steady-state waveform of a vibration description file, and mapping the frequency to a target frequency according to a preset first mapping rule and a frequency of the linear motor; and/or obtaining a transient waveform of the vibration description file and expanding the transient waveform into a waveform sequence, where the waveform sequence is formed by a plurality of target transient waveforms, a frequency of the waveform sequence is the same as a frequency of the transient waveform of the vibration description file, and a frequency of a target transient waveform is adapted to the linear motor. Therefore, both the steady-state waveform and the transient waveform can be adapted to the characteristics of the linear motor, thereby improving the vibration effect of the linear motor.

Optionally, the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor. The setting requirements of the lower limit frequency and the upper limit frequency can ensure that the vibration has sufficient intensity to be sensed by the user.

Optionally, the first mapping rule includes: an exponential rule met by a frequency distribution within a target frequency range, where the target frequency range is defined by the lower limit frequency and the upper limit frequency. By using the exponential rule, a better vibration sense can be obtained.

Optionally, after the mapping the frequency to a target frequency, the method further includes: mapping an amplitude of the steady-state waveform to a target amplitude according to a second mapping rule, where the second mapping rule includes a sin-like function rule met by an amplitude distribution within a first target amplitude range, and the first target amplitude range is defined by a lower limit amplitude of the linear motor and an upper limit amplitude of the linear motor. The vibration effect can be further improved by limiting the amplitude based on the characteristics of the linear motor. In addition, by using the sin-like function rule, a better vibration effect can be obtained.

Optionally, an amplitude of the waveform sequence is obtained by mapping an amplitude of the transient waveform of the vibration description file according to a third mapping rule; and the third mapping rule includes a sin-like function rule met by an amplitude distribution within a second target amplitude range, and the second target amplitude range is defined by a lower limit amplitude of the linear motor and an upper limit amplitude of the linear motor. The vibration effect can be further improved by limiting the amplitude based on the characteristics of the linear motor. In addition, by using the sin-like function rule, a better vibration effect can be obtained.

Optionally, an amplitude of the target transient waveform in the waveform sequence is adapted to the linear motor, to ensure that the linear motor has higher vibration intensity.

Optionally, the method further includes: using an adjusted steady-state waveform or waveform sequence as a waveform adjustment result of the vibration description file in a case that a vibration parameter of an adjusted vibration waveform does not exceed a safety limit value, to ensure the safety of the linear motor.

According to a second aspect of this application, an apparatus for adjusting a vibration waveform of a linear motor is provided, applicable to an electronic device, where the electronic device includes a linear motor, and the apparatus includes: a mapping unit and an expansion unit. The mapping unit is configured to map a frequency of a steady-state waveform of a vibration description file to a target frequency. The expansion unit is configured to expand the transient waveform of the vibration description file into a waveform sequence, where the waveform sequence is formed by a plurality of target transient waveforms, a frequency of the waveform sequence is the same as a frequency of the transient waveform of the vibration description file, and a frequency of a target transient waveform is adapted to the linear motor. The apparatus can improve the vibration effect of the linear motor Optionally, the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor.

Optionally, the first mapping rule includes: an exponential rule met by a frequency distribution within a target frequency range, where the target frequency range is defined by the lower limit frequency and the upper limit frequency. By using the exponential rule, a better vibration sense can be obtained.

Optionally, the mapping unit is further configured to map, after the mapping the frequency to a target frequency, an amplitude of the steady-state waveform to a target amplitude according to a second mapping rule, where the second mapping rule includes a sin-like function rule met by an amplitude distribution within a first target amplitude range, and the first target amplitude range is defined by a lower limit amplitude of the linear motor and an upper limit amplitude of the linear motor. The vibration effect can be further improved by limiting the amplitude based on the characteristics of the linear motor. In addition, by using the sin-like function rule, a better vibration effect can be obtained.

Optionally, the expansion unit is further configured to obtain an amplitude of the waveform sequence by mapping an amplitude of the transient waveform of the vibration description file according to a third mapping rule, where the third mapping rule includes a sin-like function rule met by an amplitude distribution within a second target amplitude range, and the second target amplitude range is defined by a lower limit amplitude of the linear motor and an upper limit amplitude of the linear motor. The vibration effect can be further improved by limiting the amplitude based on the characteristics of the linear motor. In addition, by using the sin-like function rule, a better vibration effect can be obtained.

Optionally, an amplitude of the target transient waveform in the waveform sequence is adapted to the linear motor, to ensure that the linear motor has higher vibration intensity.

Optionally, the apparatus further includes: a safety detection unit, configured to use an adjusted steady-state waveform or waveform sequence as a waveform adjustment result of the vibration description file in a case that a vibration parameter of an adjusted vibration waveform does not exceed a safety limit value, to ensure the safety of the linear motor.

According to a third aspect of this application, an electronic device is provided, including: one or more processors; and a memory, storing a program, where the program, when executed by the one or more processors, causes the one or more processors to implement the method for adjusting a vibration waveform of a linear motor according to the first aspect, to improve the vibration effect of the linear motor.

According to a fourth aspect of this application, a readable storage medium is provided, storing a computer program, where the computer program, when executed by a processor, implements the method for adjusting a vibration waveform of a linear motor according to the first aspect, to improve the vibration effect of the linear motor.

BRIEF DESCRIPTION OF DRAWINGS

FIG. 3b is an exemplary flowchart of implementing a function by the software architecture shown in FIG. 3a;

DESCRIPTION OF EMBODIMENTS

In this application, the terms "first", "second", "third", and the like in this specification, the claims, and the accompanying drawings are intended to distinguish between different objects but do not limit a particular order.

In this application, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include a/an . . . " does not exclude other same elements existing in the process, the method, the article, or the device that includes the element.

A linear motor is disposed in an electronic device, and is configured to vibrate to enable the electronic device to output a vibration sense. In different scenarios of the electronic device, the linear motor is controlled to vibrate to produce different vibration effects, so that the user senses the vibration sense, to prompt the user or provide feedback on a user operation, which is specifically as follows:

1. Different service scenarios (for example, a time prompt, information receiving, a call, an alarm clock, and a game) may correspond to different vibration effects.

2. A vibration effect is feedback to a touch operation. For example, touch operations performed on different applications (for example, photo taking and audio playing) may correspond to different vibration effects. Touch operations performed on different regions of a display screen may also correspond to different vibration effects.

Figure 1A:
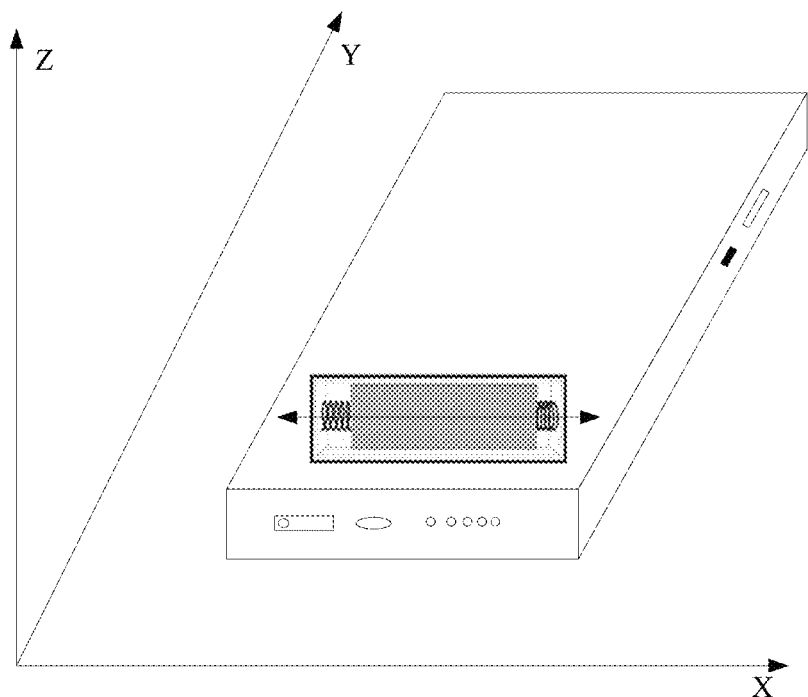
FIG. 1a is an exemplary diagram of a structure and application of an X-axis linear motor.

Linear motors commonly used in electronic devices include X-axis linear motors (or referred to as square or lateral linear motors) and Z-axis linear motors (or referred to as circular or longitudinal linear motors). FIG. 1a is an exemplary diagram of a structure and application of an X-axis linear motor, and FIG. 1b is an exemplary diagram of a structure and application of a Z-axis linear motor.

As shown in FIG. 1a, the X-axis linear motor is in the form of a long bar or square. It is assumed that the X-axis is a horizontal axis, the Y-axis is a vertical axis, and the Z-axis is a vertical axis perpendicular to the X-axis and the Y-axis, a rotor of the X-axis linear motor may move in the X-axis or Y-axis direction according to the placement direction, and can achieve a longer stroke. When mounted in the X-axis direction in the electronic device, the X-axis linear motor can provide a vibration sense in the X-axis direction; and when mounted in the Y-axis direction, the Y-axis direction can provide a vibration sense in the Y-axis direction.

Figure 1B:
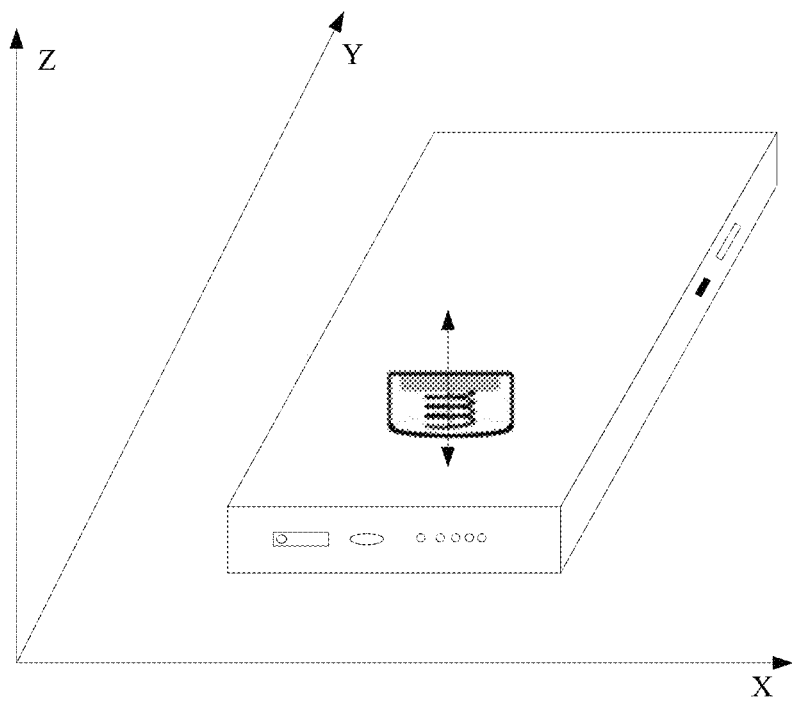
FIG. 1b is an exemplary diagram of a structure and application of a Z-axis linear motor.

As shown in FIG. 1b, the Z-axis linear motor is cylindrical and a rotor thereof may move in the Z-axis direction. The Z-axis linear motor is disposed in the electronic device and can provide a vibration sense in a thickness direction of the electronic device.

The vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor. In the following embodiments, vibration waveforms (including a steady-state waveform and a transient waveform) of the vibration description file refer to waveforms generated by parsing the vibration description file to obtain vibration parameters and vibrating with the vibration parameters. Therefore, the waveforms may be referred to as the vibration waveforms described in the vibration description file.

As can be seen, the function of the vibration description file is to indicate how the motor vibrates. Therefore, the user can configure an expected vibration effect through the vibration description file. In product realization, the vibration effect of the electronic device is realized by the linear motor. Therefore, the vibration effect is related to the attributes of the linear motor. Therefore, although the vibration effect of the electronic device is realized by configuring the vibration description file, due to different parameters of different linear motors, the vibration generated by different linear motors may not necessarily achieve the expected vibration effect even if the corresponding vibration description file is used for configuration.

Based on the features of the different types of linear motors described above, it is found by the applicant during researches that, the reasons why the linear motor cannot provide the expected vibration effect is mainly reflected in the following two aspects:

In one aspect, a frequency of the steady-state waveform of the vibration description file does not match the linear motor that implements the vibration. For example, the steady-state waveform of the vibration description file is a debug generation of the X-axis linear motor. That is, when the expected vibration sense is provided, the X-axis linear motor can provide the expected vibration sense based on the debugging of the X-axis linear motor, to obtain the vibration description file. However, the linear motor to be driven by the vibration description file is the Z-axis linear motor. As described above, the Z-axis linear motor has a smaller volume than that of the X-axis linear motor, and thus has a smaller amplitude, so that a vibration sense realized by the Z-axis linear motor under the same parameter control is weaker than a vibration sense realized by the X-axis linear motor. Moreover, since the resonant frequency of the Z-axis linear motor is higher than the resonant frequency of the X-axis linear motor, the vibration of the Z-axis linear motor cannot be sensed after the frequency is below a threshold.

In another aspect, in a case that a physical key is replaced by a virtual key, after the user presses the virtual key, the user obtains different vibration senses by using different vibration effects, to provide the user with a "soft" or "hard" press tactile sense, which, however, cannot be realized since the transient waveform of the vibration description file does not match the linear motor that implements the vibration. For example, the X-axis linear motor uses a transient waveform that has a relatively low frequency, a long duration, and an amplitude that may be large or small to simulate the "soft" tactile sense (uses a transient waveform that has a relatively high frequency, a short duration, and an amplitude that may be large or small to simulate the "hard" tactile sense). Since the resonant frequency of the Z-axis linear motor is lower than the resonant frequency of the X-axis linear motor, resulting in a decrease in the low-frequency vibration sense. Therefore, if the transient waveform that simulates the "soft" vibration sense is described in the vibration description file according to a feature of the X-axis linear motor and is implemented by the Z-axis linear motor, the user may not sense the "soft" vibration sense, and thus may not distinguish between "soft" and "hard" tactile senses.

Therefore, it is necessary to adjust the vibration waveform of the vibration description file, so that the vibration waveform is adapted to the linear motor that implements the vibration, to ensure that the expected vibration effect and the expected vibration sense are obtained.

According to the method for adjusting a vibration waveform of a linear motor disclosed in the embodiments of this application, the vibration waveform described in the vibration description file is adjusted based on the feature of the linear motor that implements the vibration, so that the vibration waveform is adapted to the linear motor that implements the vibration, to ensure that the expected vibration effect and the expected vibration sense are obtained.

The method for adjusting a vibration waveform of a linear motor disclosed in the embodiments of this application is applied to an electronic device equipped with a linear motor. The electronic device equipped with a linear motor may be a device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, or a smartwatch.

Figure 2:
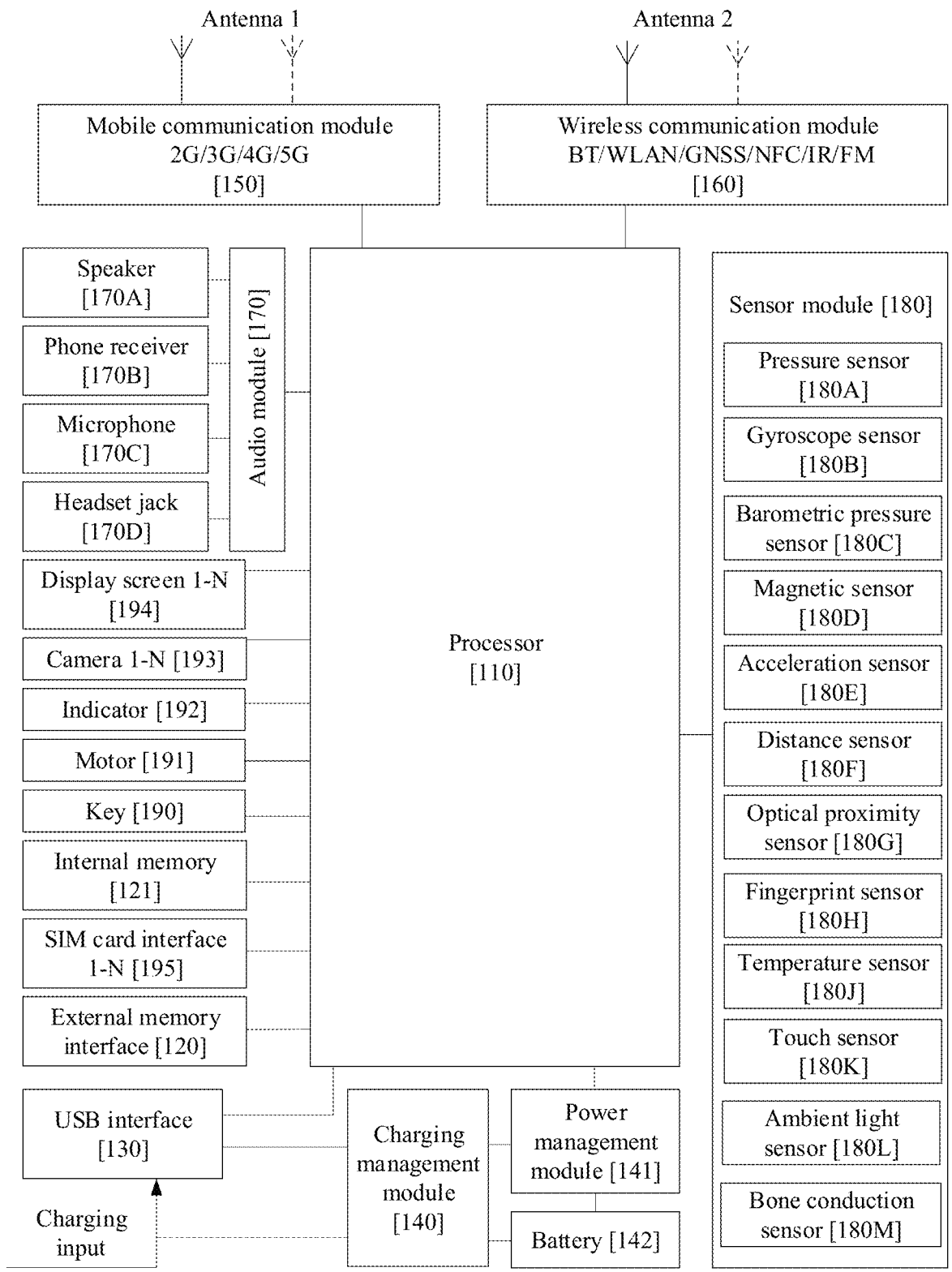
FIG. 2 is a schematic structural diagram of an electronic device according to an embodiment of this application.

The electronic device shown in FIG. 2 includes: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device. The controller may generate an operating control signal according to an instruction operation code and a sequence signal, to complete control of fetching and executing an instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is generally configured to connect the processor 110 and the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device. The processor 110 communicates with the display screen 194 by using a DSI interface, to implement a display function of the electronic device.

The GPIO interface may be configured through software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device, or may be used for data transmission between the electronic device and a peripheral device, The USB interface may also be connected to a headset to play audios through the headset. The interface may alternatively be configured to connect to another electronic device such as an AR device.

It may be understood that an interface connection relationship between the modules illustrated in this embodiment is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device. The charging management module 140 may supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in the same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device may be configured to cover one or more communication frequency bands. Different antennas may also be multiplexed to improve utilization of the antennas. For example, the antenna 1 may be multiplexed as a diversity antenna of the wireless local area network. In some other embodiments, the antenna may be used in combination with a tuning switch.

The mobile communication module 150 can provide a wireless communication solution including such as 2G/3G/4G/5G applied on the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication including a wireless local area network (wireless local area network, WLAN) (for example, a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device. The wireless communication module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device, the antenna 1 is coupled to the mobile communication module 150, and the antenna 2 is coupled to the wireless communication module 160, so that the electronic device may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS) and/or a satellite based augmentation system (satellite based augmentation system, SBAS).

The electronic device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render graphics. The processor 110 may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device may include one or N display screens 194, and N is a positive integer greater than 1.

The display screen 194 of the electronic device may display a series of graphical user interfaces (graphical user interface, GUI), which are home screens of the electronic device. Generally, the size of the display screen 194 of the electronic device is fixed, and only a limited quantity of controls can be displayed on the display screen 194 of the electronic device. A control is a GUI element, which is a software component that is included in an application and controls all data processed by the application and the interaction operations about the data. The user may interact with the control through direct manipulation (direct manipulation) to read or edit information about the application. Generally, a control may include visual interface elements such as icons, keys, menus, tabs, text boxes, dialog boxes, status bars, navigation bars, and widgets. For example, in the embodiments of this application, the display screen 194 may display a virtual key.

The electronic device may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may also optimize parameters of a photographing scene such as the exposure and the color temperature. In some embodiments, the ISP may be arranged in the camera 193.

The camera 193 is configured to capture still images or videos. An object is projected onto the photosensitive element through an optical image generated by the lens. The light-sensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP, for the ISP to convert the electrical signal into a digital image signal. The ISP outputs the digital image signal to the DSP for processing. The DSP converts the digital image signal into an image signal in the formats of such as standard RGB and YUV. In some embodiments, the electronic device may include one or N cameras 193, where N is a positive integer greater than 1.

The digital signal processor is configured to process a digital signal, and may further process another digital signal in addition to a digital image signal. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The external memory interface 120 may be configured to connect to an external storage card, for example, a micro SD card, to expand a storage capability of the electronic device. The external storage card communicates with the processor 110 by using the external memory interface 120, so as to implement a data storage function, such as storing a file such as music or a video in the external storage card.

The electronic device may implement an audio function by using the audio module 170, the speaker 170A, the phone receiver 170B, the microphone 170C, the headset jack 170D, the application processor, and the like. The audio function is, for example, music playing or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be arranged in the processor 110, or some functional modules of the audio module 170 are arranged in the processor 110.

The speaker 170A, also referred to as a "horn", is configured to convert an audio electrical signal into a sound signal. The electronic device may be used to listen to music or answer a call in a hands-free mode by using the speaker 170A.

The phone receiver 170B, also referred to as a "receiver", is configured to convert an audio electrical signal into a sound signal. When the electronic device is configured to answer a call or receive voice information, the phone receiver 170B may be put close to a human ear to receive a voice.

The microphone 170C, also referred to as a "mouthpiece" or a "megaphone", is configured to convert a sound signal into an electrical signal. When making a call or sending voice information, the user may make a sound near the microphone 170C through the mouth of the user, to input a sound signal into the microphone 170C. At least one microphone 170C may be disposed in the electronic device. In some other embodiments, two microphones 170C may be disposed in the electronic device, to collect a sound signal and implement a noise reduction function. In some other embodiments, three, four, or more microphones 170C may be alternatively disposed in the electronic device, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device determines intensity of pressure based on a change of the capacitance. When a touch operation is performed on the display screen 194, the electronic device detects intensity of the touch operation by using the pressure sensor 180A. The electronic device may further calculate a position of the touch based on a detection signal of the pressure sensor 180A. In some embodiments, touch operations that are performed on a same touch position but have different touch operation intensity may correspond to different operation instructions. For example, when a touch operation whose touch operation intensity is less than a first pressure threshold is performed on an SMS message application icon, an instruction of checking an SMS message is executed. When a touch operation whose touch operation intensity is greater than or equal to the first pressure threshold is performed on the SMS message application icon, an instruction of creating a new SMS message is executed.

The gyroscope sensor 180B may be configured to determine a motion posture of the electronic device. In some embodiments, an angular velocity of the electronic device around three axes (that is, x, y, and z axes) may be determined by using the gyroscope sensor 180B. The gyroscope sensor 180B may be used for image stabilization during photographing. For example, when the shutter is pressed, the gyro sensor 180B detects an angle at which the electronic device jitters, and calculates, based on the angle, a distance for which a lens module needs to compensate, and allows the lens to cancel the jitter of the electronic device through reverse motion, thereby implementing image stabilization. The gyro sensor 180B may also be used in navigation and a motion sensing game scene.

The barometric pressure sensor 180C is configured to measure barometric pressure. In some embodiments, the electronic device calculates an altitude by using a barometric pressure value measured by the barometric pressure sensor 180C, to assist in positioning and navigation.

The magnetic sensor 180D includes a Hall sensor. The electronic device may detect opening and closing of a flip leather case by using the magnetic sensor 180D. In some embodiments, when the electronic device is a clamshell phone, the electronic device may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect acceleration values of the electronic device in all directions (generally in three axes). When the electronic device is stationary, a magnitude and a direction of gravity may be detected. The acceleration sensor may be further configured to identify the posture of the electronic device, and is applied to switching between landscape orientation and portrait orientation, and applications such as pedometers.

The distance sensor 180F is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device may emit infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The electronic device may adaptively adjust a luminance of the display screen 194 according to sensed brightness of the ambient light. The ambient light sensor 180L may be further configured to automatically adjust white balance during photo taking. The ambient light sensor 180L may further cooperate with the optical proximity sensor 180G to detect whether the electronic device is in a pocket, so as to prevent an accidental touch.

The fingerprint sensor 180H is configured to collect a fingerprint. The electronic device may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch device". The touch sensor 180K may be disposed on the display screen 194. The touch sensor 180K and the display screen 194 form a touch screen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor may provide a visual output related to the touch operation by using the display screen 194. In some other embodiments, the touch sensor 180K may be alternatively disposed on a surface of the electronic device, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or may be a touch key. The electronic device may receive a key input, and generate a key signal input related to user setting and function control of the electronic device.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device. The electronic device may support one or N SIM card interfaces. N is a positive integer greater than 1. The SIM card interface 195 can support Nano SIM card, Micro SIM card, SIM card, and the like. A plurality of cards can be inserted into the same SIM card interface 195 together. The plurality of cards may be of the same type or different types. The SIM card interface 195 is also compatible with different types of SIM cards. The SIM card interface 195 is also compatible with external memory cards. The electronic device interacts with a network by using a SIM card, to implement functions such as a call and data communication. In some embodiments, the electronic device uses an eSIM, that is, an embedded SIM card. The eSIM card may be embedded in the electronic device and cannot be separated from the electronic device.

The motor 191 includes at least one Z-axis linear motor shown in FIG. 1b. This is because the Z-axis linear motor is smaller in volume, thereby saving space inside the electronic device and facilitating thinning of the electronic device. In this case, the vibration waveform described in the vibration description file may not achieve the expected vibration effect through the Z-axis linear motor. Therefore, it is necessary to adjust the vibration waveform described in the vibration description file.

The internal memory 121 may be configured to store computer executable program code, and the executable program code includes instructions. The processor 110 runs the instruction stored in the internal memory 121, to perform various function applications and data processing of the electronic device. For example, in this embodiment, the processor 110 may adjust the vibration waveform described in the vibration description file by executing instructions, apparatuses, or modules stored in the internal memory 121. In another example, in response to a signal inputted from the virtual key in the touchscreen, the processor 110 drives, by using the adjusted vibration waveform, the linear motor to vibrate, to provide vibration feedback on the operation of the user pressing the virtual key.

The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device is used. In addition, the internal memory 121 may include a high-speed random access memory, or may include a non-volatile memory such as at least one magnetic disk memory, a flash memory, or a universal flash storage (universal flash storage, UFS). The processor 110 runs the instructions stored in the internal memory 121 and/or the instructions stored in the memory disposed in the processor, to implement various functional applications and data processing of the electronic device.

Figure 3A:
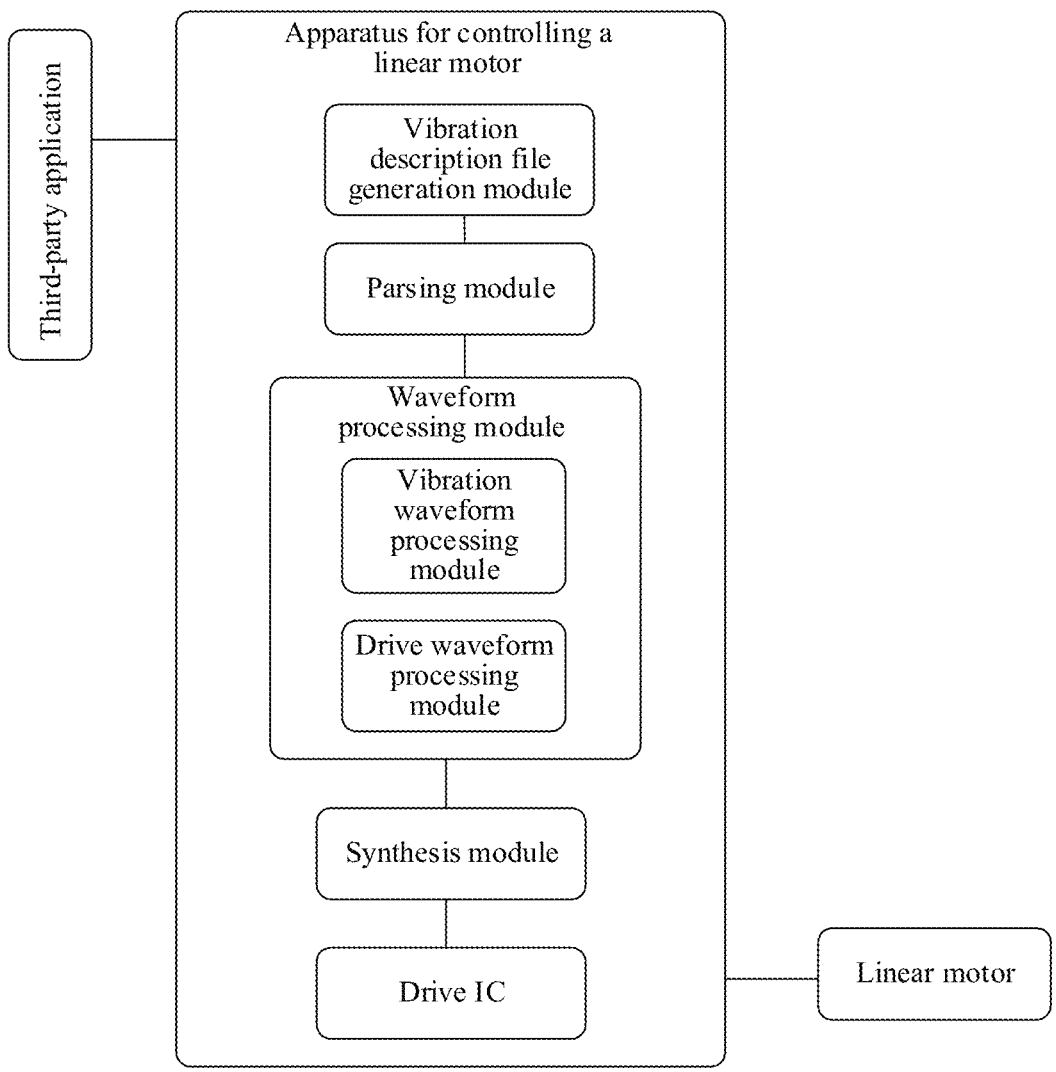
FIG. 3a is an exemplary diagram of a software architecture to which a method for adjusting a vibration waveform of a linear motor is applied according to an embodiment of this application.

Further, FIG. 3a is an example of a software architecture to which a technical solution disclosed in an embodiment of this application is applied. It can be learned with reference to the content of FIG. 3b that:

A vibration description file generation module (capable of interacting with a third-party application) is configured to generate a vibration description file. A parsing module parses the vibration description file, to obtain a file in a json format used for describing a vibration waveform. Waveform processing modules perform waveform processing operations on the file in the json format. Specifically, a vibration waveform processing module first uses a synthetic motor displacement algorithm for operations, to generate a vibration waveform in the form of a displacement bitstream according to the file in the json format and an attribute of the motor. A drive waveform processing module then performs an inverse solution operation on the vibration waveform and the attribute of the motor by using an inverse solution motor voltage drive algorithm to obtain a drive waveform.

The drive waveform obtained through the waveform processing operation by the waveform processing module is synthesized and processed by a synthesis module to obtain an audio bitstream in a format such as pulse code modulation (Pulse Code Modulation, PCM). The audio bitstream is then transmitted to a drive integrated circuit (Integrated Circuit, IC) through a protocol such as a real-time transport protocol (Real-time Transport Protocol, RTP), and finally acts on the linear motor to control operation of the linear motor.

Figure 3B:
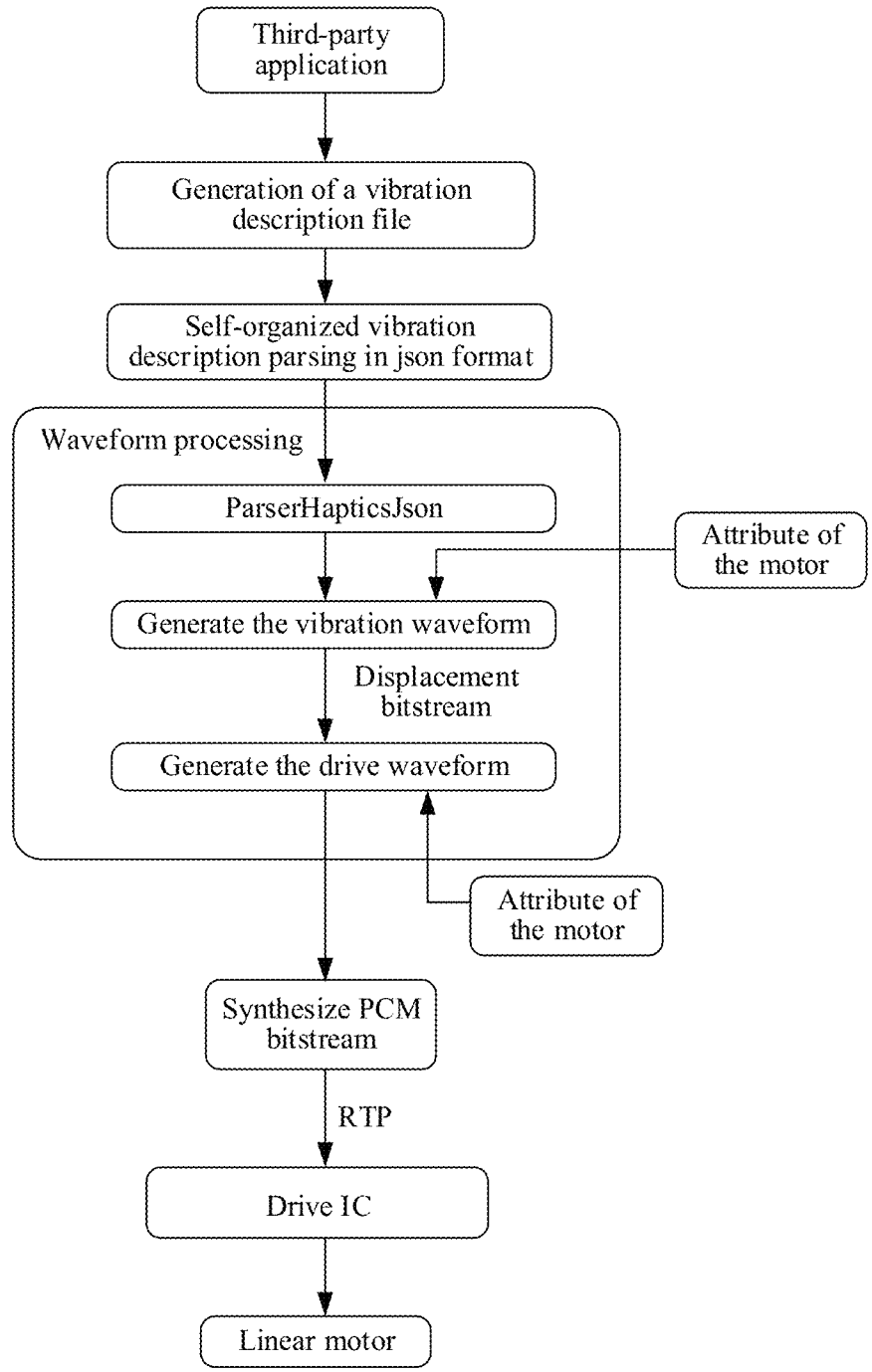

With reference to the structure of the foregoing electronic device, the software architecture shown in FIG. 3a may be stored in the internal memory 121 and invoked by the processor 110 to implement the process described in FIG. 3b.

The method for adjusting a vibration waveform of a linear motor according to the embodiments of this application may be applied to the vibration waveform processing module in FIG. 3a. The method for adjusting a vibration waveform of a linear motor is described in detail below.

Figure 4:
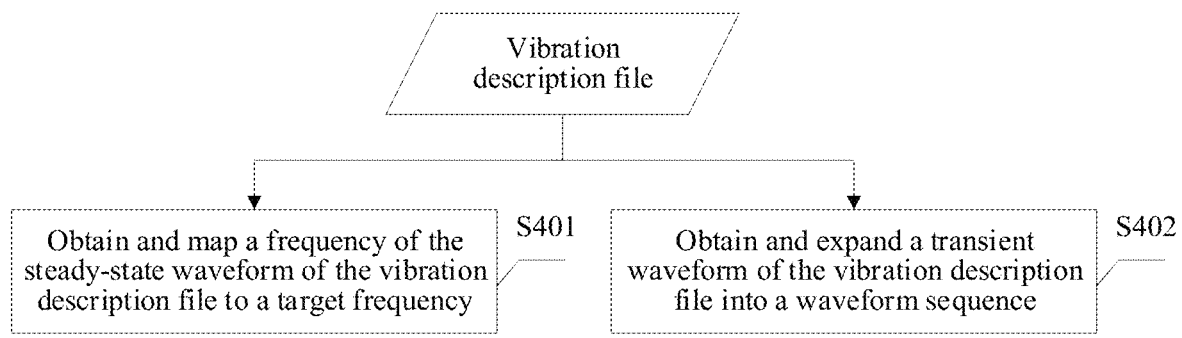
FIG. 4 is a flowchart of a method for adjusting a vibration waveform of a linear motor according to an embodiment of this application.

FIG. 4 shows a method for adjusting a vibration waveform of a linear motor disclosed in an embodiment of this application. The method includes the following steps:

S401. Map a frequency of a steady-state waveform described in a vibration description file to a target frequency.

The steady-state waveform is a vibration waveform of the linear motor that is driven to undergo a rising stage, a stable vibration stage, and a stop stage. The rising stage, the stable vibration stage, and the stop stage are three stages that the linear motor undergoes from the beginning of the vibration to the end of the vibration. In the rising stage, the vibration form of the linear motor is expressed as free damping vibration accompanied by forced vibration. In the stable vibration stage, the vibration form of the linear motor is expressed as steady-state forced vibration of equal magnitude. In the stop stage, the vibration form of the linear motor is expressed as free damping vibration.

In this step, the target frequency is obtained according to a lower limit frequency, an upper limit frequency, and a preset first mapping rule.

The lower limit frequency meets that: an amplitude of the linear motor at the lower limit frequency is greater than a preset threshold. The purpose of setting the preset threshold is to ensure that the vibration intensity can be sensed by the user. Therefore, the preset threshold may be pre-configured according to the actual vibration effect of the linear motor. When the amplitude is not greater than the preset threshold, the vibration sense of the linear motor may be weak, which reduces the sensing of the user for the vibration. Therefore, an amplitude of the lower limit frequency is greater than the preset threshold, so that the sensing of the user for the vibration is not weakened.

The upper limit frequency falls within a resonant frequency range of the linear motor, that is, may be any value in the resonant frequency range. Since a frequency in the resonant frequency range of the linear motor corresponds to a large amplitude, the upper limit frequency is set in the resonant frequency range, which ensures that the linear motor has higher vibration intensity, to ensure that the user can sense the vibration sense.

The first mapping rule indicates a rule for mapping from the lower limit frequency and the upper limit frequency to the target frequency. The first mapping rule may be pre-configured, and detailed content is described in the following embodiments.

Figure 5:
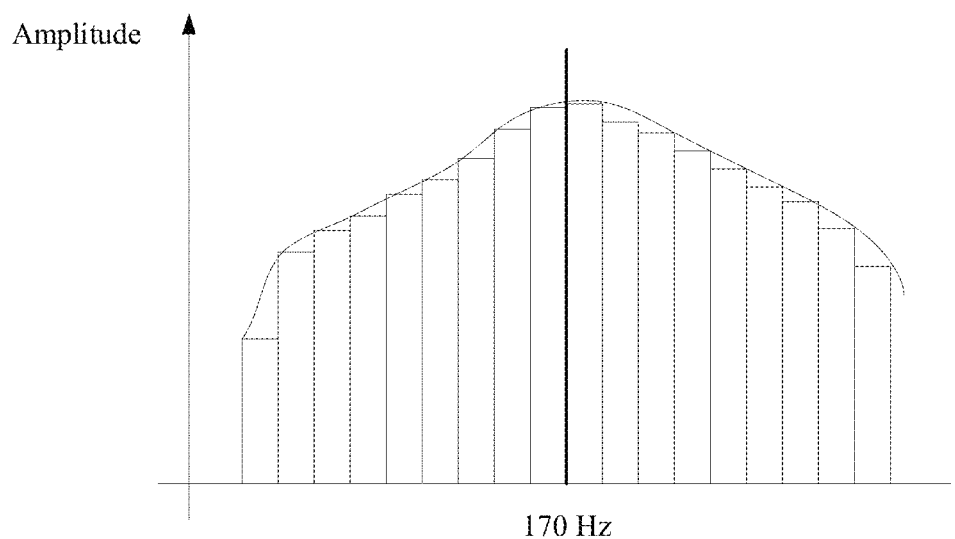
FIG. 5 is an exemplary diagram of a steady-state waveform of a vibration description file.
Figure 6:
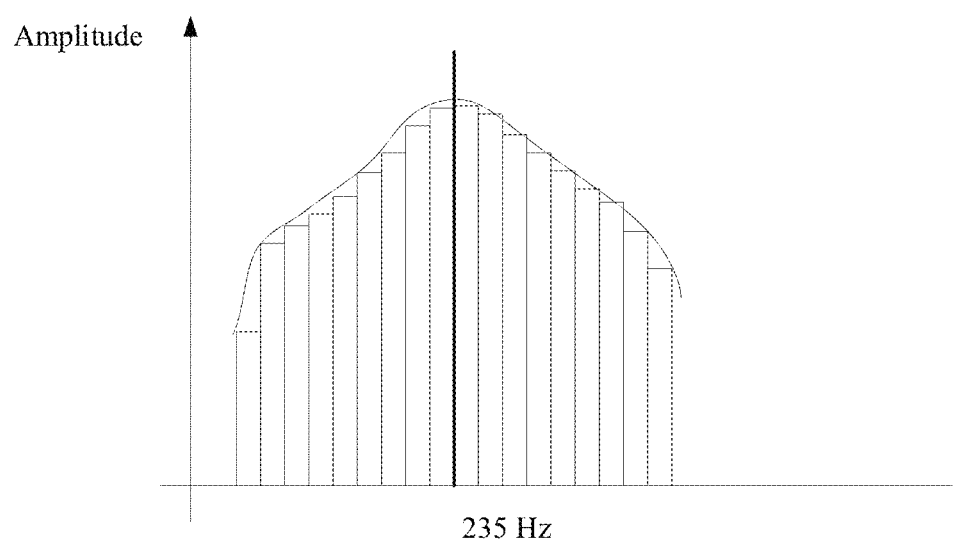
FIG. 6 is an example diagram of a waveform obtained by performing frequency mapping on the steady-state waveform shown in FIG. 5.

Taking FIG. 5 as an example, the frequency of the steady-state waveform described in the vibration description file is 170 Hz, that is, the resonant frequency of the X-axis linear motor. It is assumed that the linear motor that implements the vibration is the Z-axis linear motor. The resonant frequency of the Z-axis linear motor is generally 235 Hz. Therefore, when the vibration waveform described in the vibration description file is directly used to control the vibration of the Z-axis linear motor, the expected vibration sense may not be obtained. Therefore, according to S201, the exemplary steady-state waveform of FIG. 5 may be mapped to the exemplary steady-state waveform of FIG. 6. As can be seen, the frequency is mapped from 170 Hz to the target frequency of 235 Hz.

As can be seen, after the frequency mapping, the target frequency is not related to the frequency of the steady-state waveform described in the vibration description file, but only related to the linear motor that implements the vibration. Therefore, the vibration waveform is more adapted to the linear motor that implements the vibration. Even if the volume of the linear motor that implements the vibration is small, it can be ensured that under the same control parameters, the vibration waveform has a comparable vibration effect and vibration sense with the linear motor of a large volume. That is, S401 can resolve the problem of the first aspect above.

S402. Expand a transient waveform described in the vibration description file into a waveform sequence.

The transient waveform is a vibration waveform of the linear motor that is driven to undergo only the rising stage.

As described in the another aspect above, the "soft" tactile sense needs to be implemented by a low-frequency transient waveform, but a resonant spectrum of the Z-axis linear motor is higher than that of the X-axis linear motor. Therefore, a vibration sense generated by the Z-axis linear motor controlled by the transient waveform described in the vibration description file cannot be sensed. Therefore, in this step, the transient waveform described in the vibration description file is expanded into the waveform sequence formed by a plurality of transient waveforms. The waveform sequence, compared with the transient waveform, increases the quantity of vibrations, that is, the vibration sense changes from "vibrating once" to "vibrating many times", thereby helping the user to sense the vibration sense.

In this step, the waveform sequence is formed by a plurality of target transient waveforms, where a frequency of the waveform sequence is the same as a frequency of a transient waveform described in the vibration description file, and a frequency of a target transient waveform is adapted to the linear motor.

Figure 7:
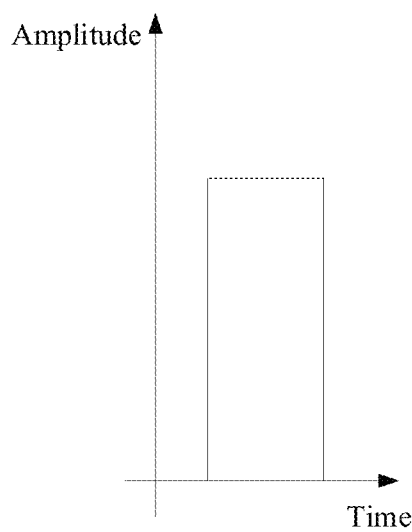
FIG. 7 is an exemplary diagram of a transient waveform of a vibration description file.
Figure 8:
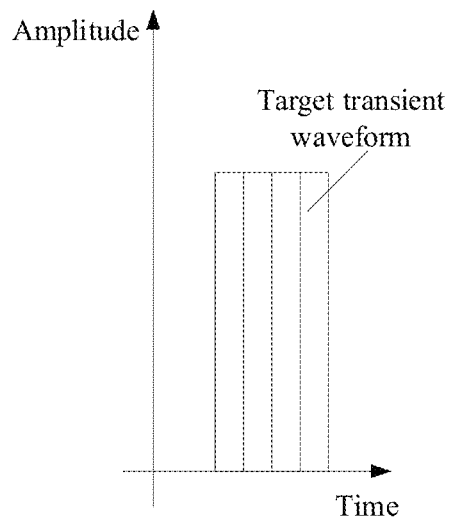
FIG. 8 is an exemplary diagram of a waveform sequence obtained by expanding the transient waveform shown in FIG. 7.

That the frequency of the target transient waveform is adapted to the linear motor means that the frequency of the target transient waveform is in the resonant frequency range of the linear motor. For example, the frequency of the target transient waveform is the resonant frequency of the linear motor, ensuring that the linear motor has higher vibration intensity, so that the user can sense the vibration sense, and the foundation for the user to further sense "soft" or "hard" is laid. FIG. 7 is an example of a transient waveform described in a vibration description file, and FIG. 8 shows a waveform sequence obtained by expanding the transient waveform shown in FIG. 7. A frequency of the waveform sequence in FIG. 8 is the same as a frequency of the transient waveform shown in FIG. 7.

As described above, the vibration duration is a feature distinguishing between "soft" and "hard". Moreover, the frequency of the waveform sequence is the same as the frequency of the transient waveform described in the vibration description file. Therefore, the transient waveform described in the description file is expanded into the waveform sequence, so that the waveform sequence can follow an expected tactile sense of the transient waveform described in the vibration description file due to different quantities of transient waveforms in the waveform sequence, to distinguish between "soft" and "hard".

In summary, even if the linear motor that implements the vibration is small in volume, the simulation of "soft" or "hard" can be achieved, that is, S402 can resolve the problem of the second aspect above.

In summary, the method for adjusting a vibration waveform of a linear motor provided in this embodiment can improve the vibration effect of the linear motor, so that the linear motor achieves a vibration sense required (by the user).

It should be noted that, since the vibration description file may include a plurality of vibration events, that is, may include both transient vibration events and steady-state vibration events, at least one of or both S402 and S402 may be performed.

Figure 9:
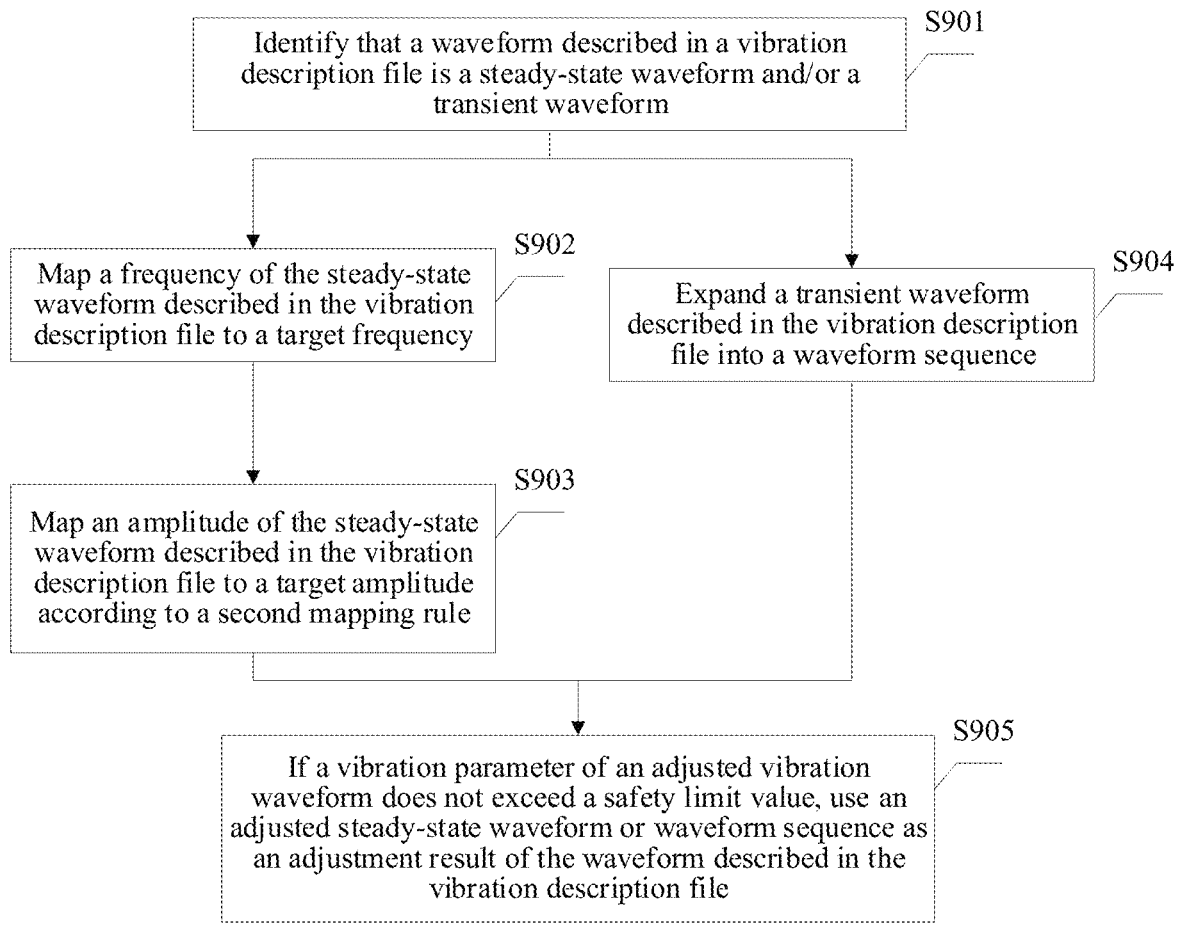
FIG. 9 is a flowchart of another method for adjusting a vibration waveform of a linear motor according to an embodiment of this application.

FIG. 9 shows another method for adjusting a vibration waveform of a linear motor disclosed in an embodiment of this application. Compared with the foregoing embodiment, the main difference is that frequency mapping rules and amplitude determination rules are further defined.

As shown in FIG. 9, the method includes the following steps:

S901: Identify that a waveform of a vibration description file is at least one of a steady-state waveform or a transient waveform.

It may be understood that, an identifier indicating the steady-state waveform or the transient waveform may be included in the vibration description file. The type of the waveform is identified through the identifier.

S902. Map a frequency of the steady-state waveform of the vibration description file to a target frequency.

The target frequency is obtained according to a lower limit frequency, an upper limit frequency, and a preset first mapping rule.

Optionally, the first mapping rule is an exponential rule met by a frequency distribution within a target frequency range, where the target frequency range is defined by the lower limit frequency and the upper limit frequency. That is, a frequency distributed in the target frequency range meets the exponential rule: assuming the target frequency range is [a, b], other frequency values in [a, b] meet an exponential relationship with a and b.

It should be noted that, in this embodiment, the exponential rule is adopted, to obtain through the following experimental process: frequencies mapped in various rules (including the exponential rule, a linear rule, and the like). Vibration sense parameters of the user corresponding to the frequencies are measured, and an optimal vibration sense parameter is obtained by comparison. A frequency corresponding to the optimal vibration sense parameter is an optimal frequency. Experiments prove that mapping through the exponential rule yields the optimal frequency. It may be understood that, the vibration sense parameters may be set according to requirements, and are not defined herein.

As can be seen, selecting the exponential relationship from the perspective of the vibration sense of the user can enable the user to obtain a better vibration sense, to obtain better user experience.

S903: Map an amplitude of the steady-state waveform described in the vibration description file to a target amplitude according to a second mapping rule.

The second mapping rule is a sin-like function rule met by an amplitude distribution within a first target amplitude range, where the first target amplitude range is defined by a lower limit amplitude of the linear motor and an upper limit amplitude of the linear motor. That is, an amplitude distributed in the first target amplitude range meets the sin-like function rule: assuming the first target amplitude range is [c, d], other amplitude values in [c, d], c, and d meet a sin-like function relationship.

Specifically, the lower limit amplitude of the linear motor is generally a minimum amplitude that can be felt, for example, 0; and the upper limit amplitude is an amplitude at a specified frequency, for example, an amplitude corresponding to a resonant frequency. The amplitude is selected from this range to ensure that the vibration is sensed. Further, the process of selecting the sin-like function rule is similar to the process of selecting the foregoing exponential rule, that is, selected from a variety of rules based on a vibration sense. Therefore, for the limitation of the amplitude, it is ensured that the user senses the vibration sense from the dimension of the amplitude, and the sin-like function rule is further used, which enables the user to obtain a better vibration sense.

An example of an application scenario of S902 and S903 is: According to an expected vibration sense, the user generates a steady-state waveform based on the debugging of the X-linear motor, and further generates a vibration description file of the steady-state waveform.

However, the linear motor configured on the electronic device is the Z-axis linear motor, that is, the linear motor to be driven by the vibration description file is the Z-axis linear motor. The Z-axis linear motor has a smaller volume than that of the X-axis linear motor, and resonant frequencies thereof are much different, so that a vibration sense realized by the Z-axis linear motor under the same parameter control is weaker than a vibration sense realized by the X-axis linear motor. Therefore, the vibration generated by the Z-axis linear motor driven by the vibration description file on the electronic device cannot achieve the expected vibration sense. In the prior art, the user needs to reconfigure a vibration description file for the Z-axis linear motor. However, in this embodiment, S902 and S903 redefines the frequency and the amplitude adapted to the Z-axis linear motor through the mapping of the frequency and amplitude, to adjust the vibration waveform adapted to the X-axis linear motor to obtain the vibration waveform adapted to the Z-axis linear motor, thereby providing the possibility for the Z-axis linear motor to realize a vibration sense similar to that of the X-axis linear motor. Therefore, the user does not need to reconfigure the vibration description file to achieve the expected vibration sense on different types of linear motors by using the same vibration description file.

S904. Expand a transient waveform described in the vibration description file into a waveform sequence.

The waveform sequence is formed by a plurality of target transient waveforms. A frequency of the waveform sequence is the same as a frequency of the transient waveform described in the vibration description file.

Optionally, an amplitude of the target transient waveform is adapted to the linear motor, for example, the amplitude of the target transient waveform is an amplitude of a resonant frequency of the linear motor.

Further, an amplitude of the waveform sequence is obtained by mapping an amplitude of a transient waveform described in the vibration description file according to a third mapping rule. Specifically, the third mapping rule includes a sin-like function rule met by an amplitude distribution within a second target amplitude range, where the second target amplitude range is defined by a lower limit amplitude of the linear motor and an upper limit amplitude of the linear motor. The limitation of amplitude can further improve the vibration effect. In addition, the used of the sin-like function rule can enable the user to obtain a better vibration sense, to obtain better user experience.

It may be understood that in this embodiment, an example is taken in which the second mapping rule and the third mapping rule are the same. In practice, the second mapping rule and the third mapping rule may be alternatively the same, which is not limited herein.

An example of an application scenario of S904 is: According to expected "soft" and "hard" tactile senses, the user generates a steady-state waveform based on the debugging of the X-linear motor, and further generates a vibration description file of the steady-state waveform. However, the linear motor configured on the electronic device is the Z-axis linear motor, that is, the linear motor to be driven by the vibration description file is the Z-axis linear motor. The Z-axis linear motor has a smaller volume than that of the X-axis linear motor, and resonant frequencies thereof are much different, so that a vibration sense realized by the Z-axis linear motor under the same parameter control is weaker than a vibration sense realized by the X-axis linear motor. Even an amplitude of a low frequency part of a vibration waveform of the X-axis linear motor cannot be sensed on the Z-axis linear motor. Therefore, on the electronic device equipped with the Z-axis linear motor, the user cannot obtain the "soft" or "hard" tactile senses after a virtual key is pressed. However, in S904, the quantity of transient waveforms is increased, so that the "soft" tactile sense can be simulated. Further, since the frequency of the waveform sequence is the same as the frequency of the transient waveform described in the vibration description file, the "soft" and "hard" tactile senses can be distinguished. Therefore, the user does not need to reconfigure the vibration description file to distinguish between the "soft" and "hard" tactile senses on different types of linear motors by using the same vibration description file.

S905: If a vibration parameter of an adjusted vibration waveform does not exceed a safety limit value, use an adjusted steady-state waveform or waveform sequence as an adjustment result of the waveform described in the vibration description file.

Specifically, the safety limit value may include an amplitude limit value. The amplitude limit value is determined according to a maximum voltage and a maximum stroke of the linear motor. The purpose of setting the safety limit value is to reduce the probability of damage to the linear motor caused by adjusting the vibration waveform.

In summary, the method for adjusting a vibration waveform of a linear motor disclosed in this embodiment has the following beneficial effects:

1. In a case of mismatch between the vibration description file and the linear motor, the vibration sense of the linear motor of a small volume can be improved, so that the linear motor of a small volume can achieve richer vibration sense experience.

2. The universality of the vibration description file is improved. Even if the vibration description file does not match the linear motor, it is not necessary to modify the vibration description file to adapt to the linear motor, but instead, the vibration waveform is adjusted to obtain a vibration waveform adapted to the linear motor.

3. Based on the adjustment of the vibration waveform, the safety of the linear motor is ensured.

It should be noted that, the foregoing embodiments are described by taking the linear motor of a small volume as an example, but are not limited to the linear motor of a small volume, but instead, to all linear motors.

Figure 10:
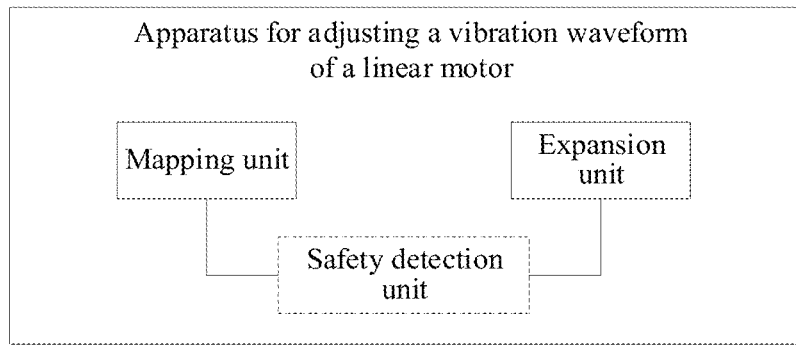
FIG. 10 is a schematic structural diagram of an apparatus for adjusting a vibration waveform of a linear motor according to an embodiment of this application.

FIG. 10 shows an apparatus for adjusting a vibration waveform of a linear motor according to an embodiment of this application. The apparatus includes a mapping unit and an expansion unit. Optionally, the apparatus may further include a safety detection unit.

The mapping unit is configured to obtain a frequency of a steady-state waveform of a vibration description file, and map the frequency to a target frequency according to a preset first mapping rule and a frequency of the linear motor.

The expansion unit is configured to obtain a transient waveform of the vibration description file and expand the transient waveform into a waveform sequence, where the waveform sequence is formed by a plurality of target transient waveforms, a frequency of the waveform sequence is the same as a frequency of the transient waveform of the vibration description file, and a frequency of a target transient waveform is adapted to the linear motor.

The safety detection unit is configured to use, if a vibration parameter of an adjusted vibration waveform does not exceed a safety limit value, an adjusted steady-state waveform or waveform sequence as an adjustment result of the waveform described in the vibration description file.

Optionally, the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor.

Optionally, the first mapping rule may be an exponential rule met by a frequency distribution within a target frequency range, where the target frequency range is defined by the lower limit frequency and the upper limit frequency.

Optionally, the mapping unit is further configured to map, after the mapping a frequency of a steady-state waveform described in a vibration description file to a target frequency, an amplitude of the steady-state waveform described in the vibration description file to a target amplitude according to a second mapping rule, where the second mapping rule includes a sin-like function rule met by an amplitude distribution within a first target amplitude range, and the first target amplitude range is defined by a lower limit amplitude of the linear motor and an upper limit amplitude of the linear motor.

Optionally, the expansion unit is further configured to obtain an amplitude of the waveform sequence by mapping an amplitude of the transient waveform of the vibration description file according to a third mapping rule, where the third mapping rule includes a sin-like function rule met by an amplitude distribution within a second target amplitude range, and the second target amplitude range is defined by a lower limit amplitude of the linear motor and an upper limit amplitude of the linear motor.

Optionally, an amplitude of the target transient waveform in the waveform sequence is adapted to the linear motor.

For specific implementations of the functions of the foregoing units, reference may be made to the foregoing embodiments, and details are not described herein again.

The apparatus for adjusting a vibration waveform of a linear motor shown in FIG. 10 can achieve the expected vibration effect, especially in a case that the vibration waveform described in the vibration description file is implemented based on a linear motor of a large volume and the linear motor that implements the vibration has a small volume, so that the linear motor of a small volume achieves a vibration effect comparable to that of the linear motor of a large volume.

An embodiment of this application further provides a readable storage medium, storing a computer program, where the computer program, when executed by a processor, implements the method for adjusting a vibration waveform of a linear motor according to the foregoing embodiments, to improve the vibration effect of the linear motor.

What is claimed is:

1. A method for adjusting a vibration waveform of a linear motor, applicable to an electronic device, wherein the electronic device comprises a linear motor, and the method comprises:
  in response to a vibration description file comprising a steady-state waveform, adjusting the steady-state waveform of the vibration description file, wherein the adjusting of the steady-state waveform of the vibration description file comprises obtaining a frequency of the steady-state waveform of the vibration description file, and mapping the frequency to a target frequency according to a preset first mapping rule and a frequency of the linear motor; and
  in response to the vibration description file comprising a transient waveform, adjusting the transient waveform of the vibration description file, wherein the adjusting of the transient waveform of the vibration description file comprises expanding the transient waveform into a waveform sequence, and wherein the waveform sequence is formed by a plurality of target transient waveforms, a frequency of the waveform sequence is the same as a frequency of the transient waveform of the vibration description file, and a frequency of each of the plurality of target transient waveforms is adapted to the linear motor.

2. The method for adjusting a vibration waveform of a linear motor according to claim 1, wherein the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor.

3. The method for adjusting a vibration waveform of a linear motor according to claim 2, wherein the first mapping rule comprises:
   an exponential rule met by a frequency distribution within a target frequency range, wherein the target frequency range is defined by the lower limit frequency and the upper limit frequency.

4. The method for adjusting a vibration waveform of a linear motor according to claim 1, wherein after the mapping the frequency to a target frequency, the method further comprises:
   mapping an amplitude of the steady-state waveform to a target amplitude according to a second mapping rule, wherein the second mapping rule comprises a sin-like function rule met by an amplitude distribution within a first target amplitude range, and the first target amplitude range is defined by a lower limit amplitude of the linear motor and an upper limit amplitude of the linear motor.

5. The method for adjusting a vibration waveform of a linear motor according to claim 1, wherein an amplitude of the waveform sequence is obtained by mapping an amplitude of the transient waveform of the vibration description file according to a third mapping rule; and
   the third mapping rule comprises a sin-like function rule met by an amplitude distribution within a second target amplitude range, and the second target amplitude range is defined by a lower limit amplitude of the linear motor and an upper limit amplitude of the linear motor.

6. The method for adjusting a vibration waveform of a linear motor according to claim 1, wherein an amplitude of each of the plurality of target transient waveforms in the waveform sequence is adapted to the linear motor.

7. The method for adjusting a vibration waveform of a linear motor according to claim 1, further comprising:
   using an adjusted steady-state waveform or waveform sequence as a waveform adjustment result of the vibration description file in a case that a vibration parameter of an adjusted vibration waveform does not exceed a safety limit value.

8. An apparatus for adjusting a vibration waveform of a linear motor, applicable to an electronic device, wherein the electronic device comprises a linear motor, and the apparatus comprises a processor, configured to perform the following:
   in response to a vibration description file comprising a steady-state waveform, adjusting the steady-state waveform of the vibration description file, wherein the adjusting of the steady-state waveform of the vibration description file comprises obtaining a frequency of the steady-state waveform of a vibration description file, and mapping the frequency to a target frequency according to a preset first mapping rule and a frequency of the linear motor; and
   in response to the vibration description file comprising a transient waveform, adjusting the transient waveform of the vibration description file, wherein the adjusting of the transient waveform of the vibration description file comprises expanding the transient waveform into a waveform sequence, and wherein the waveform sequence is formed by a plurality of target transient waveforms, a frequency of the waveform sequence is the same as a frequency of the transient waveform of the vibration description file, and a frequency of each of the plurality of target transient waveforms is adapted to the linear motor.

9. The apparatus for adjusting a vibration waveform of a linear motor according to claim 8, wherein the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor.

10. The apparatus for adjusting a vibration waveform of a linear motor according to claim 9, wherein the first mapping rule comprises:
    an exponential rule met by a frequency distribution within a target frequency range, wherein the target frequency range is defined by the lower limit frequency and the upper limit frequency.

11. The apparatus for adjusting a vibration waveform of a linear motor according to claim 8, wherein the processor is further configured to:
    map, after the mapping the frequency to a target frequency, an amplitude of the steady-state waveform to a target amplitude according to a second mapping rule, wherein the second mapping rule comprises a sin-like function rule met by an amplitude distribution within a first target amplitude range, and the first target amplitude range is defined by a lower limit amplitude of the linear motor and an upper limit amplitude of the linear motor.

12. The apparatus for adjusting a vibration waveform of a linear motor according to claim 8, wherein the processor is further configured to:
    obtain an amplitude of the waveform sequence by mapping an amplitude of the transient waveform of the vibration description file according to a third mapping rule, wherein the third mapping rule comprises a sin-like function rule met by an amplitude distribution within a second target amplitude range, and the second target amplitude range is defined by a lower limit amplitude of the linear motor and an upper limit amplitude of the linear motor.

13. The apparatus for adjusting a vibration waveform of a linear motor according to claim 8, wherein an amplitude of each of the plurality of target transient waveforms in the waveform sequence is adapted to the linear motor.

14. The apparatus for adjusting a vibration waveform of a linear motor according to claim 8, wherein the processor is further configured to:
    use an adjusted steady-state waveform or waveform sequence as a waveform adjustment result of the vibration description file in a case that a vibration parameter of an adjusted vibration waveform does not exceed a safety limit value.

15. An electronic device, comprising:
    one or more processors; and
    a memory, storing a program, wherein
    the program, when executed by the one or more processors, causes the one or more processors to implement operations for adjusting a vibration waveform of a linear motor, the operations comprising:
    in response to a vibration description file comprising a steady-state waveform, adjusting the steady-state waveform of the vibration description file, wherein the adjusting of the steady-state waveform of the vibration description file comprises obtaining a frequency of the steady-state waveform of a vibration description file, and mapping the frequency to a target frequency according to a preset first mapping rule and a frequency of the linear motor; and in response to the vibration description file comprising a transient waveform, adjusting the transient waveform of the vibration description file, wherein the adjusting of the transient waveform of the vibration description file comprises expanding the transient waveform into a waveform sequence, and wherein the waveform sequence is formed by a plurality of target transient waveforms, a frequency of the waveform sequence is the same as a frequency of the transient waveform of the vibration description file, and a frequency of each of the plurality of target transient waveforms is adapted to the linear motor.

16. The electronic device according toclaim 15, wherein the target frequency is obtained according to a lower limit frequency, an upper limit frequency, and a preset first mapping rule, the lower limit frequency meets that: an amplitude of the linear motor at the lower limit frequency is greater than a preset threshold, and the upper limit frequency falls within a resonant frequency range of the linear motor.

17. The electronic device according to claim 16, wherein the first mapping rule comprises:
an exponential rule met by a frequency distribution within a target frequency range, wherein the target frequency range is defined by the lower limit frequency and the upper limit frequency.

18. The electronic device according to claim 15, wherein the operations further comprise:
mapping, after the mapping the frequency to a target frequency, an amplitude of the steady-state waveform to a target amplitude according to a second mapping rule, wherein the second mapping rule comprises a sin-like function rule met by an amplitude distribution within a first target amplitude range, and the first target amplitude range is defined by a lower limit amplitude of the linear motor and an upper limit amplitude of the linear motor.

19. The electronic device according to claim 15, wherein the operations further comprise:
obtaining an amplitude of the waveform sequence by mapping an amplitude of the transient waveform of the vibration description file according to a third mapping rule, wherein the third mapping rule comprises a sin-like function rule met by an amplitude distribution within a second target amplitude range, and the second target amplitude range is defined by a lower limit amplitude of the linear motor and an upper limit amplitude of the linear motor.

20. The electronic device according to claim 15, wherein an amplitude of each of the plurality of target transient waveforms in the waveform sequence is adapted to the linear motor.

\* \* \* \* \*